United States Patent
Woldemar et al.

(10) Patent No.: US 7,281,852 B2
(45) Date of Patent: Oct. 16, 2007

(54) SPOOL BEARING WITH ASYMMETRIC SEALING

(75) Inventors: Christopher Woldemar, Santa Cruz, CA (US); Norbert S. Parsoneault, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 669 days.

(21) Appl. No.: 10/741,070

(22) Filed: Dec. 19, 2003

(65) Prior Publication Data

US 2004/0156568 A1    Aug. 12, 2004

Related U.S. Application Data

(60) Provisional application No. 60/435,672, filed on Dec. 19, 2002.

(51) Int. Cl.
*F16C 33/74* (2006.01)
*F16C 32/06* (2006.01)

(52) U.S. Cl. .................... 384/130; 384/107
(58) Field of Classification Search ........... 384/100, 384/107, 112, 119, 121, 130, 131, 132
See application file for complete search history.

(56) References Cited

U.S. PATENT DOCUMENTS

| | | | | |
|---|---|---|---|---|
| 5,558,445 A | * | 9/1996 | Chen et al. | 384/132 |
| 5,634,724 A | * | 6/1997 | Zang et al. | 384/107 |
| 5,876,124 A | * | 3/1999 | Zang et al. | 384/107 |
| 5,941,644 A | * | 8/1999 | Takahashi | 384/112 |
| 6,307,293 B1 | * | 10/2001 | Ichiyama | 310/90.5 |

* cited by examiner

*Primary Examiner*—Thomas R. Hannon
*Assistant Examiner*—Justin Krause
(74) *Attorney, Agent, or Firm*—Wax Law Group

(57) ABSTRACT

A spindle motor is provided comprising a fixed shaft capable of being fastened at either end to the base and cover of the disc drive. The hub which rotates around the disc drive is supported for rotation by a journal bearing and thrust bearing, with the thrust bearing grooved surfaces being defined in gaps immediately adjacent the ends of the journal bearing. A fluid recirculation path is provided through the rotating sleeve connecting the surfaces adjacent the thrust bearings, with the asymmetry which provides the fluid circulation either being inherently present due to tolerances in the bearing and groove design, or specifically provided by asymmetry in the bearing groove pattern. An asymmetric sealing system employs a pumping seal adjacent a radial end of the thrust plate near the base of the housing, and a shorter pumping seal defined adjacent a radial end of the thrust plate distal from the base.

19 Claims, 2 Drawing Sheets

SPOOL BEARING WITH ASYMMETRIC SEALING

CROSS REFERENCE TO A RELATED APPLICATION

This application claims priority to a provisional application Ser. No. 60/435,672, filed Dec. 19, 2002, by Woldemar and Parsoneault, and entitled Spool Bearing with Asymmetric Sealing. This application is incorporated herein by reference.

FIELD OF THE INVENTION

The invention relates generally to fluid dynamic bearing motors, and more particularly to a fluid dynamic bearing motor having an air purging feature and an asymmetric sealing.

BACKGROUND OF THE INVENTION

Disc drive memory systems have been used in computers for many years for storage of digital information. Information is recorded on concentric tracks of a magnetic disc medium, the actual information being stored in the forward magnetic transitions within the medium. The discs themselves are rotatably mounted on a spindle, while the information is accessed by read/write heads has generally located on a pivoting arm which moves radially over the surface of the rotating disc. The read/write heads or transducers must be accurately aligned with the storage tracks on the disk to ensure proper reading and writing of information.

During operation, the discs are rotated at very high speeds within an enclosed housing using an electric motor generally located inside the hub or below the discs. Such known spindle motors typically have had a spindle mounted by two ball bearings to a motor shaft disposed in the center of the hub. The bearings are spaced apart, with one located near the top of the spindle and the other spaced a distance away. These bearings allow support the spindle or hub about the shaft, and allow for a stable rotational relative movement between the shaft and the spindle or hub while maintaining accurate alignment of the spindle and shaft. The bearings themselves are normally lubricated by highly refined grease or oil.

The conventional ball bearing system described above is prone to several shortcomings. First is the problem of vibration generated by the balls rolling on the bearing raceways. This is one of the conditions that generally guarantee physical contact between raceways and balls, in spite of the lubrication provided by the bearing oil or grease. Hence, bearing balls running on the generally even and smooth, but microscopically uneven and rough raceways, transmit the rough surface structure as well as their imperfections in sphericity in the vibration of the rotating disc. This vibration results in misalignment between the data tracks and the read/write transducer. This source of vibration limits the data track density and the overall performance of the disc drive system. Vibration results in misalignment between the data tracks and the read/write transducer. Vibration limits therefore the data track density and the overall performance of the disc drive system.

Further, ball bearings are not always scalable to smaller dimensions. This is a significant drawback, since the tendency in the disc drive industry has been to continually shrink the physical dimensions of the disc drive unit.

As an alternative to conventional ball bearing spindle systems, much effort has been focused on developing a fluid dynamic bearing. In these types of systems lubricating fluid, either gas or liquid, functions as the actual bearing surface between a stationary shaft supported from the base of the housing, and the rotating spindle or hub. Liquid lubricants comprising oil, more complex fluids, or other lubricants have been utilized in such fluid dynamic bearings. The reason for the popularity of the use of such fluids is the elimination of the vibrations caused by mechanical contact in a ball bearing system, and the ability to scale the fluid dynamic bearing to smaller and smaller sizes.

Because of the lack of mechanical connection between the shaft and rotating sleeve, consideration must be given to maintaining the axial and radial stability of the system especially for highly loaded multi-plater applications. In such designs, it is important that some means be provided for purging air from the system, as the presence of such air bubbles can both diminish bearing life, and weaken the radial and axial stability of the system.

It is further desirable to provide in such a design, where both journal and thrust bearings must typically be provided to support the loads, for a reservoir to maintain fluid levels, and an adequate seal design to prevent air bubbles from entering the system.

SUMMARY OF THE INVENTION

The present invention is intended to provide a relatively low cost motor for supporting a plurality of discs in a disc drive.

The invention is further intended to provide a low cost stabilized motor design with enhanced axial and radial stability.

The present invention is further intended to provide a motor design with an air purging feature.

In one embodiment, the disc drive motor of the present invention comprises a spool bearing which is adapted to be fastened to both the base and top cover of the housing for the disc drive.

In one embodiment, the spindle motor of the present invention comprises a fixed shaft capable of being fastened at either end to the base and cover of the disc drive. In a preferred embodiment, the hub which rotates around the disc drive is supported for rotation by a journal bearing and thrust bearing, with the thrust bearing grooved surfaces being defined in gaps adjacent the ends of the journal bearing. A fluid recirculation path is provided through the rotating hub connecting the surfaces adjacent the thrust bearing, with the asymmetry which provides the fluid circulation either being inherently present due to tolerances in the bearing graft and groove design, or specifically provided by asymmetry in the bearing groove pattern.

An asymmetric sealing system is provided, preferably comprising a longer pumping seal at the end of the thrust plate nearer the base of the housing, and a shorter pumping seal defined adjacent a radial end of the other thrust plate nearer the top cover. At the end of the gap near the top cover, and adjacent the shorter pumping seal, a centrifugal seal with a reservoir is provided to support the fluid necessary to be maintained into the system.

BRIEF DESCRIPTION OF THE DRAWINGS

So that the manner in which the exemplary embodiments of the invention can be understood, a description of the invention briefly summarized above follows below with reference to the appended drawings. It is to be noted however that the drawings illustrate only typical exemplary embodiments of this invention are not to be considered limiting thereof of the scope, for the invention may include either other equally effective embodiments.

DETAILED DESCRIPTION OF THE PREFERRED EMBODIMENTS

Figure 1:
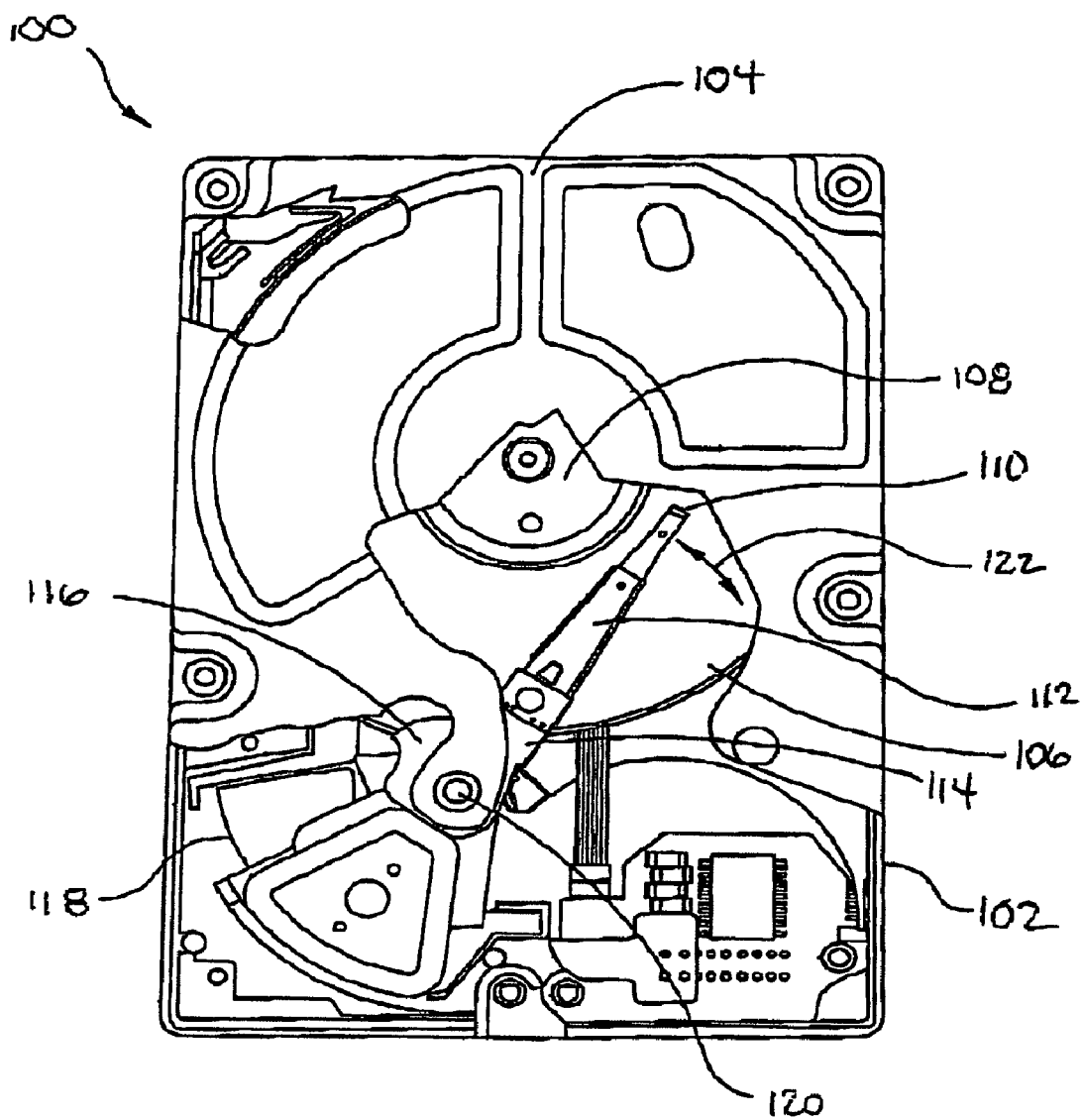
FIG. 1 depicts a planned view of one embodiment of the disc drive that could efficiently utilize a motor incorporating the present invention.

FIG. 1 depicts a plan view of one embodiment of a disk drive 10 for use with embodiments of the invention. Referring to FIG. 1, the disk drive 10 includes a housing base 102 and a top cover plate 104. The housing base 102 is combined with cover plate 104 to form a sealed environment to protect the internal components from contamination by elements outside the sealed environment. The base and cover plate arrangement shown in FIG. 1 is well known in the industry; however, other arrangements of the housing components have frequently been used, and aspects of the invention are not limited by the particular configuration of the disk drive housing.

Disk drive 10 further includes a disk pack 106 that is mounted on a hub 225 (see FIG. 2) for rotation on a spindle motor (not shown) by a disk clamp 108. Disk pack 106 includes one or more individual disks that are mounted for co-rotation about a central axis. Each disk surface has an associated read/write head 110 that is mounted to the disk drive 100 for communicating with the disk surface. In the example shown in FIG. 1, read/write heads 110 are supported by flexures that are in turn attached to head mounting arms 112 of an actuator 116. The actuator shown in FIG. 1 is of the type known as a rotary moving coil actuator and includes a voice coil motor (VCM), shown generally at 118. Voice coil motor 118 rotates actuator 116 with its attached read/write heads 110 about a pivot shaft 120 to position read/write heads 110 over a desired data track along a path 122.

Figure 2:
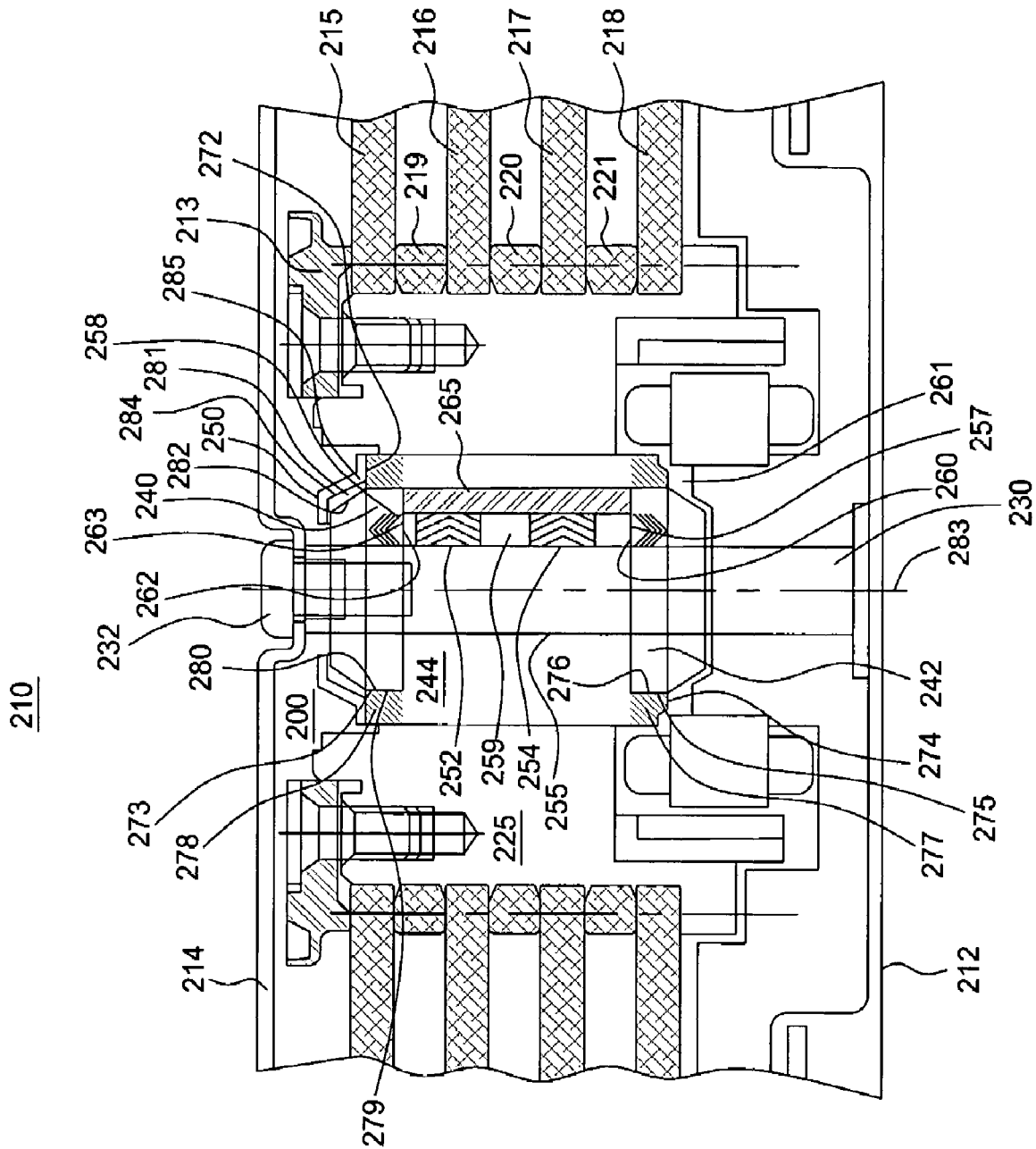
FIG. 2 was a side sectional view of a motor incorporating an exemplary embodiment of the present invention.

FIG. 2 is a sectional view of a fluid dynamic bearing motor according to one embodiment of the present invention. FIG. 2 illustrates a spindle motor in a disc drive 210 comprising a base 212 and cover 214. The fixed shaft 230 supports a sleeve 244 which in turn supports a hub 225 for rotation about the shaft. The hub 225 is especially adapted to support a plurality of discs 215, 216, 217, 218 separated by spacers 219, 220, 221 for rotation about the shaft 230, the discs being held in place by a disc clamp 213. Because the design to be described in detail below is especially useful (although not exclusively useful) with multi-platter designs, the shaft 230 must be quite stiff. It is typically, although not necessarily, held in place by a screw or similar fastening means 232 passed through the top cover 214.

This need for additional axial and radial stiffness because of the weight demand imposed by multiple platters requires a fluid dynamic bearing that provides significant radial and axial stiffness. To achieve these goals, in this invention a fluid dynamic bearing system comprising at least one journal bearing and two thrust bearings in a spool bearing configuration is adopted. To implement this approach, a pair of thrust plates 240, 242 are fixed to the shaft spaced apart along the shaft to accommodate the sleeve 244. The inner surface of the sleeve 259 defines a gap with the outer surface of the shaft 230. A fluid dynamic journal bearing is established by grooves 252, 254 which are shown defined on a surface of the sleeve 259; the grooves could be equally well defined on the outer surface of the shaft. Further, the need grooves need not be discontinuous. Fluid in the gap between these two surfaces, pressurized by these grooves, provides radial stiffness for the system along the length of the fixed shaft.

This fluid bearing gap further extends continuously between the axial facing surfaces of the sleeve 259 and the thrust plates 240, 242 where thrust bearings 257, 258 are defined. These thrust bearings are established by groove patterns on either the surface of the thrust plate 240, 242 or the facing surface 260, 262 of the sleeve. The fluid in this gap, pressurized by these grooves, provides for axial stiffness in the system.

In order to provide for air purging, that is purging air bubbles from the fluid which supports relative rotation of the sleeve and shaft, a fluid recirculation path 265 is provided extending generally axially through the shorter sleeve section 259 from the lower thrust surface 260 to the upper thrust surface 262. The fluid circulates typically in a generally counter clockwise direction through this recirculation path 265 and the gap defining the thrust bearings and the gap defining the journal bearings. The impetus for recirculation is provided either by the irregularies which inherently exist in the journal bearings 252, 254, or by designing some asymmetry into the journal bearings 252, 254 or the thrust bearings 257, 258. The recirculation path entry and exit are usually radially outboard of the thrust bearing groove patterns.

The fluid bearing gap is further extended between radially facing surfaces 273, 280 of the second section of the sleeve and the upper thrust plate respectively; and also between surfaces 275, 276 of the sleeve and lower thrust plate respectively. Groove patterns 277, 278 are provided on one surface of each of these pairs of radially facing surfaces to establish lower and upper pumping seals. The lower pumping seal defined by grooves 277 is defined as a stronger pumping seal, pumping fluid away from the base of the motor (as drawn) to maintain fluid within the system. The grooves are further defined to function as a capillary seal so that when the system is at rest, and the sleeve is not turning, then the fluid which is drawn by capillary forces into the lower portion of the fluid bearing gap rests in the grooves of the stronger pumping seal 277 and is not lost.

At the other end of the gap near the top cover 214, the groove pattern 278 defines a relatively weaker pumping seal which pumps fluid down toward the fluid bearing gap which defines the thrust bearings and journal bearings. This weaker pumping seal region is fluidly coupled to a centrifugal capillary seal defined between a surface 284 of a shield 285 supported from the sleeve shoulder surface 272, 272 and a surface 282 of the which is supported from the shaft 230. These surfaces are generally axial and inclined thrust plate away from to one another to promote meniscus formation to retain fluid in the reservoir. Further, typically both surfaces are inclined relative to the central axis of the central shaft so that the bearing fluid is retained in reservoir region 281 between the relatively inclined surfaces; the region 281 functions as a reservoir for both filling the fluid dynamic bearing gap and maintaining fluid within the gap over long term operation of the system. The surfaces of the thrust plate and shield eventually taper close together to prevent fluid loss by shock or evaporation.

Since the pumping seal 278 is weaker than the lower, stronger pumping seal 277, even with provision of this reservoir, the upper pumping seal 278 does not overpower the lower pumping seal 277 and cause fluid loss from the lower end of the system. The use of the pumping seal and reservoir also provides a relatively simple means for filling the fluid bearing system by providing an opening to the outside atmosphere.

In summary, the present design provides a relatively low cost motor design especially though not exclusively useful for highly loaded multi-plater applications. By virtue of the asymmetry either inherently present in or designed into the bearing gap system, the provision of the recirculation path which is fluidly coupled to the weaker pumping seal and reservoir allows for purging of air bubbles. The fluid bearing system has fluid which can be easily filled and maintained within the system.

Other features and advantages of this invention would be apparent to a person of skill in the art who studies this disclosure. Therefore, the scope of the invention is to be limited only by the following claims.

What is claimed is:

1. A fluid dynamic bearing system comprising a fixed shaft, a sleeve rotatable around the shaft, the shaft supporting first and second thrust plates axially spaced apart along the shaft, the sleeve having a first surface and cooperating with a surface of the shaft to define a journal bearing and the sleeve also having a radially extending surface cooperating with a radially extending surface of the first thrust plate and the second thrust plate to define a first thrust bearing and a second thrust bearing, the sleeve including a second surface facing a second thrust plate surface, the second thrust plate surface extended from the radially extending surfaces of the first and second thrust plates to establish a first pumping seal at a first end of a gap of the fluid dynamic bearing pumping toward a second pumping seal at an opposite second end of the fluid dynamic bearing gap, wherein the first pumping seal is relatively stronger than the second pumping seal as provided by a groove pattern on at least one of the sleeve second surface and the thrust plate second surface at the first gap end.

2. A fluid dynamic bearing system as claimed in claim 1 including a fluid recirculation path extending through the sleeve between the first and second thrust bearings.

3. A fluid dynamic bearing system as claimed in claim 2 wherein fluid flow through the gap between the first and second thrust bearings, the journal bearings, and the recirculation path is maintained by asymmetries in the bearings naturally occurring due to manufacturing tolerances.

4. A fluid dynamic bearing system as claimed in claim 2 wherein the fluid circulation through the fluid dynamic bearing gap connecting the first and second thrust bearings and the journal bearings is maintained by asymmetry designed into the journal bearing to establish a fluid flow from the journal bearing to the first thrust bearing at the first gap end to the fluid recirculation path to the second thrust bearing at the second gap end and to the journal bearing.

5. A fluid dynamic bearing system as claimed in claim 2 wherein the journal bearing comprises first and second groove patterns on one of the surfaces facing the journal bearing.

6. A fluid dynamic bearing system as claimed in claim 2 wherein the fluid recirculation path is located radially distal from the shaft and outboard of groove patterns for the first and second thrust bearings.

7. A fluid dynamic bearing system as claimed in claim 1 wherein the groove pattern at the first gap end is longer than a groove pattern at the second gap end.

8. A fluid dynamic bearing system as claimed in claim 7 wherein the groove pattern at the first gap end is defined to function as a capillary seal to retain fluid when the system is at rest.

9. A fluid dynamic bearing system as claimed in claim 7 further comprising a centrifugal seal adjacent the end of the fluid dynamic bearing gap defined by the second gap end.

10. A fluid dynamic bearing system as claimed in claim 9 wherein the centrifugal seal is defined between a surface of a shield supported from a section of the sleeve and a facing surface of the thrust plate, at least one of the surfaces being at an angle to the axis of the shaft.

11. A fluid dynamic bearing system as claimed in claim 9 wherein the centrifugal seal surfaces are both at an angle to each other and at an angle to the axis of the shaft, defining a reservoir adjacent an end of the fluid dynamic bearing gap.

12. A fluid dynamic bearing system comprising a fixed shaft, a sleeve rotatable around the shaft, the shaft supporting first and second thrust plates axially spaced apart along the shaft, the sleeve having a first surface and cooperating with a surface of the shaft to define a journal bearing and the sleeve also having a radially extending surface cooperating with a radially extending surface of the first thrust plate and the second thrust plate to define a first and second thrust bearing, the system further including first and second pumping seal means located at opposite ends of the journal bearing and pumping toward each other, the first pumping seal means being relatively stronger than then second pumping seal means as provided by a groove pattern on a facing surface at the journal bearing end having the first pumping seal means, and fluid in a gap in said fluid dynamic bearing system to support relative rotation of the shaft and sleeve.

13. A fluid dynamic bearing system as in claim 12 further including a centrifugal seal defined adjacent the second pumping seal means and comprising a surface of a shield supported from the sleeve and a surface of the thrust plate, the surfaces of the shield and the thrust plate being at an angle to one another.

14. A fluid dynamic bearing system as claimed in claim 13 wherein the first and second pumping seal means each utilize a surface of the sleeve extended past a radial surface of the first and second thrust plates to establish the first pumping seal means at one end of the fluid dynamic bearing pumping toward the second pumping seal means at the opposite end of the fluid dynamic bearing gap.

15. A fluid dynamic bearing system as claimed in claim 14 wherein the groove pattern on a facing surface at the journal bearing end having the first pumping seal means is defined to function as a capillary seal to retain fluid when the system is at rest.

16. A fluid dynamic bearing system as claimed in claim 13 including a fluid recirculation path extending through the sleeve between the first and second thrust bearings.

17. A fluid dynamic bearing system as claimed in claim 16 wherein the fluid circulation through the fluid dynamic bearing gap connecting the first and second thrust bearings and the journal bearings is maintained by asymmetry designed into the journal bearing to establish a fluid flow from the journal bearing to the first thrust bearing at the journal bearing end having the first pumping seal means to the fluid recirculation path to the second thrust bearing at the journal bearing end having the second pumping seal means and to the journal bearing.

18. A fluid dynamic bearing system as claimed in claim 13 wherein the centrifugal seal surfaces are both at an angle to each other and at an angle to the axis of the shaft, defining a reservoir adjacent an end of the fluid dynamic bearing gap.

19. A fluid dynamic bearing system as claimed in claim 12 wherein the groove pattern on a facing surface at the journal bearing end having the first pumping seal means is longer than a groove pattern on a facing surface at the journal bearing end having the second pumping seal means.

* * * * *